US007067215B2

(12) United States Patent
Lazaroff et al.

(10) Patent No.: US 7,067,215 B2
(45) Date of Patent: Jun. 27, 2006

(54) FUEL CELL AND METHOD OF MANUFACTURING SAME USING CHEMICAL/MECHANICAL PLANARIZATION

(75) Inventors: Dennis Lazaroff, Corvallis, OR (US); Peter Mardilovich, Corvallis, OR (US); David Champion, Lebanon, OR (US); Gregory S Herman, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 409 days.

(21) Appl. No.: 10/286,235

(22) Filed: Oct. 31, 2002

(65) Prior Publication Data

US 2004/0086754 A1    May 6, 2004

(51) Int. Cl.
*H01M 8/02*   (2006.01)
*H01M 8/10*   (2006.01)
*B05D 5/12*   (2006.01)

(52) U.S. Cl. .............................. 429/38; 429/30; 429/32; 427/115; 427/126.1

(58) Field of Classification Search ................. 429/30, 429/32, 33, 38; 427/115, 126.1
See application file for complete search history.

(56) References Cited

U.S. PATENT DOCUMENTS

| 4,248,941 | A | * | 2/1981 | Louis et al. ............... 429/30 X |
| 4,749,632 | A | * | 6/1988 | Flandermeyer et al. ... 429/33 X |
| 4,799,936 | A | * | 1/1989 | Riley ........................ 429/30 X |
| 4,883,497 | A | * | 11/1989 | Claar et al. ............... 429/33 X |
| 6,583,350 | B1 | * | 6/2003 | Gee et al. .................... 136/253 |
| 6,645,656 | B1 | * | 11/2003 | Chen et al. .................... 429/32 |
| 6,649,031 | B1 | * | 11/2003 | Iqbal et al. .......... 427/126.1 X |
| 6,677,070 | B1 | * | 1/2004 | Kearl ........................... 429/33 |
| 6,835,488 | B1 | * | 12/2004 | Sasahara et al. .......... 429/30 X |

* cited by examiner

Primary Examiner—Stephen J. Kalafut

(57) ABSTRACT

A method of making a fuel cell includes the following steps. A pattern is placed on a base surface to create a predetermined topography on the base surface. An anode layer, a cathode layer and/or an electrolyte layer is/are deposited over the pattern. Areas of higher topography are removed from areas of lower topography using chemical mechanical planarization to form a predetermined fuel cell structure.

41 Claims, 6 Drawing Sheets

FIG. 5A
DEPOSIT ELECTROLYTE

FIG. 5B
DEPOSIT SACRIFICIAL LAYER

FIG. 5C
PATTERN SACRIFICIAL LAYER

FIG. 5D
DEPOSIT ELECTROLYTE

FIG. 5E
CMP ELECTROLYTE

FIG. 5F
REMOVE SACRIFICIAL LAYER

FIG 7A — DEPOSIT ANODE/CATHODE

FIG 7B — DEPOSIT AND PATTERN ANODE/CATHODE

FIG 7C — DEPOSIT ELECTROLYTE

FIG 7D — DEPOSIT CATHODE/ANODE

FIG 7E — CMP BACK

FUEL CELL AND METHOD OF MANUFACTURING SAME USING CHEMICAL/MECHANICAL PLANARIZATION

BACKGROUND OF THE INVENTION

The present invention relates generally to fuel cells, and more particularly to fuel cells fabricated by chemical/mechanical planarization (CMP).

Fuel cells use an electrochemical energy, conversion of hydrogen and oxygen into electricity and heat. It is anticipated that fuel cells may be able to replace primary and secondary batteries as a portable power supply. In fuel cells, the fuel (containing a source of hydrogen) is oxidized with a source of oxygen to produce (primarily) water and carbon dioxide. The oxidation reaction at the anode, which liberates electrons, in combination with the reduction reaction at the cathode, which consumes electrons, results in a useful electrical voltage and current through the load.

As such, fuel cells provide a direct current (DC) voltage that may be used to power motors, lights, electrical appliances, etc. A solid oxide fuel cell (SOFC) is one type of fuel cell that may be useful in portable applications.

Unfortunately, the material properties, which are generally desirable in order to obtain high performing fuel cell devices, also make fabrication of those fuel cell devices a significant challenge.

Thin film ceramic patterning is a fairly new application. Many of the possible solutions involve thin film integrated circuit techniques that may not be well suited for refractory, generally dense metal oxide films. Some examples of patterning processes and drawbacks associated therewith include the following. With wet etching, it is very difficult to identify highly selective etchants. In plasma/dry etching (ion milling), there is often undesirable redeposition of material on sidewalls. The redeposited materials may be an undesirable phase, may adversely affect stoichiometry, and/or may make inappropriate electrical connections. Plasma etching is also relatively slow with generally no selectivity. Lift off masking is not able to withstand high temperature sintering. Further, the lift-off mask generally leaves a shadow after deposition (i.e. the deposition is non-continuous). No patterning, i.e. coating porous substrates with anode on one side and cathode on the other, greatly limits the architectures available. Shadow masking may leave particulates behind, and is rather limited in geometry resolution, for example, deposited layers generally cannot be under about 100 microns–150 microns in minimum feature size.

SUMMARY OF THE INVENTION

The present invention solves the drawbacks enumerated above by providing a method of making a fuel cell. A pattern is placed on a base surface to create a predetermined topography on the base surface. An anode layer, a cathode layer and/or an electrolyte layer is/are deposited over the pattern. Areas of higher topography are removed from areas of lower topography using chemical mechanical planarization to form a predetermined fuel cell structure.

BRIEF DESCRIPTION OF THE DRAWINGS

Objects, features and advantages of embodiments of the present invention may become apparent upon reference to the following detailed description and drawings, in which.

DETAILED DESCRIPTION OF THE EMBODIMENTS

The present invention is predicated upon the unexpected and fortuitous discovery that novel and desirable fuel cell devices having a predetermined architecture may be made relatively simply, quickly and efficiently through use of chemical/mechanical polishing (CMP; also known as chemical/mechanical planarization) in conjunction with pre-placement of a pattern to create the predetermined topography. It has further been discovered that novel and desirable fuel cell devices having freestanding membranes may also be made by embodiments of processes of the present invention.

Embodiments of the present invention describe novel methods for fabricating fuel cell devices. Although the present disclosure is not limited to a particular type of fuel cell, the various methods described may advantageously be used to fabricate various solid oxide fuel cell devices, including such devices on a micron scale. The solid oxide fuel cell (SOFC) devices may be thin film SOFCs, thick film SOFCs, or hybrid thin/thick film SOFCs.

The use of CMP advantageously overcomes the patterning challenges associated with metal oxide etch and/or lift off. CMP removes material substantially planarly as opposed to vertically, in that CMP polishes or laps a base surface holding the fuel cell structure to selectively remove areas of higher topography from areas of lower topography. Polishing or lapping may be achieved by a variety of methods, including but not limited to polishing with slurry suspensions, lapping with diamond impregnated cloths or stones, using a blade to scrape material (micro-toming), and polishing using a material that chemically attacks one or more films, in conjunction with a mechanical process.

CMP advantageously enables a process for planarization of very hard and brittle materials, substantially without the risk of redepositing undesirable residues on the remaining films. Further, this method enables fabrication of unique SOFC structures that would be very difficult, if not impossible by other processes.

Advantages of embodiments of the present invention include, but are not limited to the following. CMP is a relatively low temperature gradient process; for example, CMP may be accomplished at room temperature. Embodiments of the methods of the present invention provide a process(es) for planarization of high refractory materials, substantially without undesirable redeposition of removed materials. Further, embodiments of methods of the present invention enable fabrication of unique SOFC structures, e.g. fuel cells on the micron scale.

Figure 1:
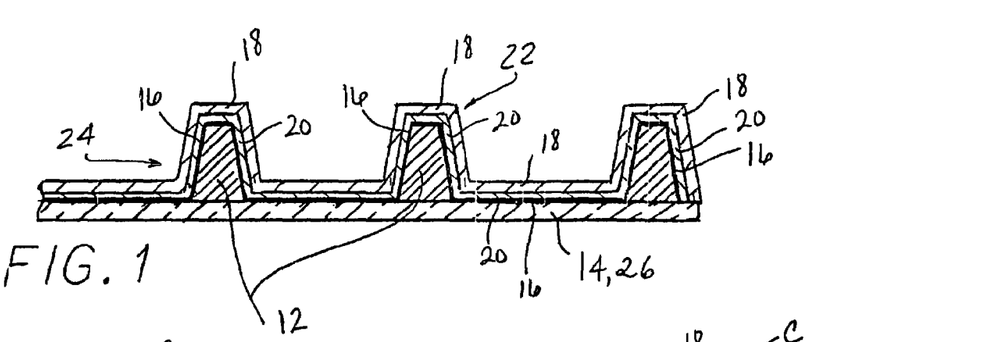
FIG. 1 is a cutaway, cross-sectional side view of an embodiment of the present invention before CMP and optional removal of pattern material.
Figure 8:
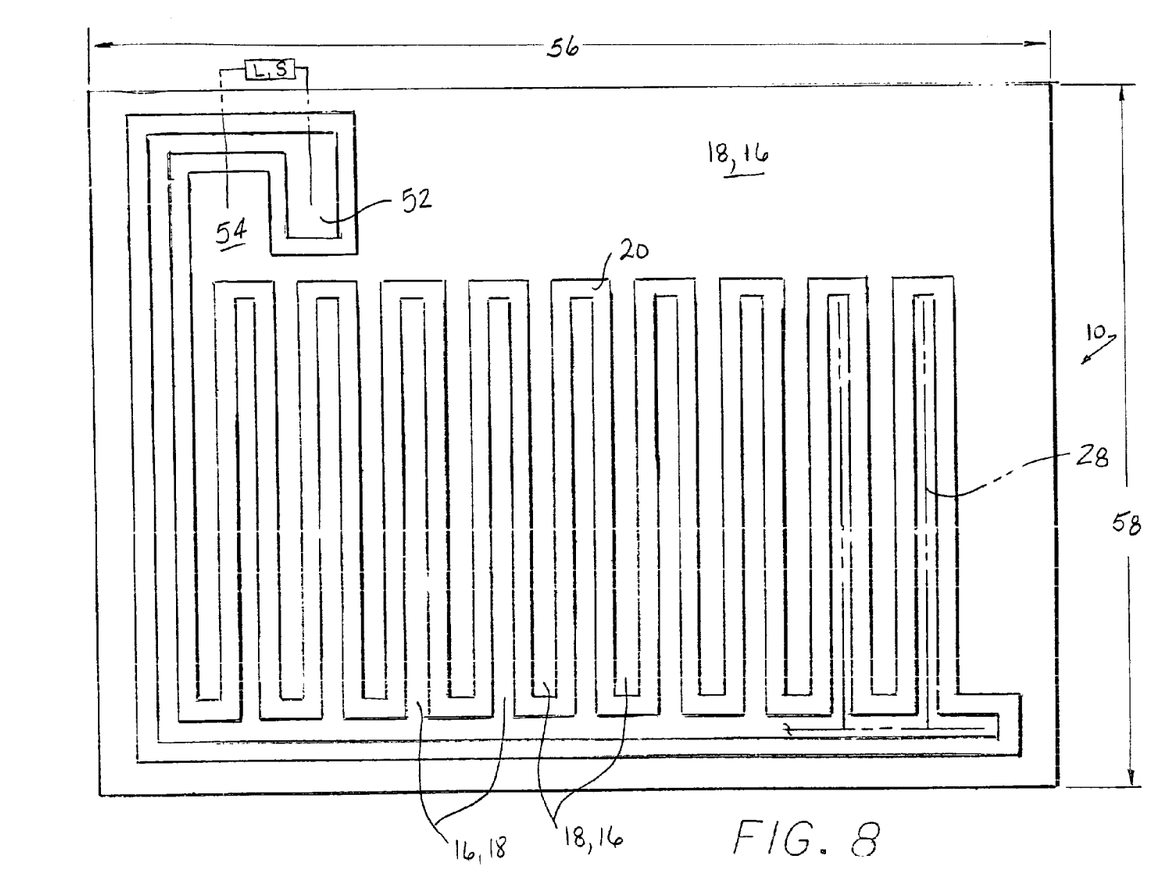
FIG. 8 is a top view of the embodiment of FIG. 6E, also showing some representative current collectors in phantom.

Referring now to FIG. 1, a method of making a fuel cell comprises the step of placing a pattern 12 on a base surface 14 to create a predetermined topography on the base surface 14. It is to be understood that base surface 14 may be a substrate 26, an anode 16, a cathode 18, an electrolyte 20, and/or a current collector 28 (FIG. 8).

It is to be understood that any suitable material for substrate 26 may be chosen. In an embodiment, the substrate 26 is formed from at least one of single crystal silicon, polycrystalline silicon, silicon oxide containing dielectric substrates, alumina, sapphire, ceramic, and mixtures thereof. In an alternate embodiment of the present invention, single crystal silicon is a substrate 26 of choice.

The method further comprises the step of depositing an anode layer 16, a cathode layer 18 and/or an electrolyte layer 20 over the pattern 12. Although in FIG. 1 an anode layer 16 is deposited over the pattern 12 first, then an electrolyte layer 20, then a cathode layer 18, it is to be understood that, in any of the embodiments set forth herein, cathode layer 18 may be deposited over the pattern 12 first, then electrolyte layer 20, then anode layer 16. Further, it is to be understood that only one or two layers of any of the active fuel cell elements may be deposited over the pattern 12 (and 42 as discussed hereinbelow), or two or more layers of the same active element.

It is to be understood that the fuel cell 10 may be one of solid oxide fuel cells, proton conducting ceramic fuel cells, alkaline fuel cells, Polymer Electrolyte Membrane (PEM) fuel cells, molten carbonate fuel cells, solid acid fuel cells, and Direct Methanol PEM fuel cells. In an embodiment of the present invention, fuel cell 10 is a solid oxide fuel cell.

The electrolyte 20 may be formed from any suitable material. In an embodiment of the present invention, electrolyte 20 is at least one of oxygen ion conducting membranes, proton conductors, carbonate ($CO_3^{2-}$) conductors, $OH^-$ conductors, and mixtures thereof.

In an alternate embodiment, electrolyte 20 is at least one of cubic fluorite structures, doped cubic fluorites, proton-exchange polymers, proton-exchange ceramics, and mixtures thereof. In a further alternate embodiment, electrolyte 20 is at least one of yttria-stabilized zirconia, samarium doped-ceria, gadolinium doped-ceria, $La_aSr_bGa_cMg_dO_{3-\delta}$, and mixtures thereof.

It is to be understood that the anode layer 16 and cathode layer 18 may be formed from any suitable material, as desired and/or necessitated by a particular end use. In an embodiment, each of the anode layer 16 and cathode layer 18 is at least one of metals, ceramics and cermets.

In an embodiment of the present invention, some non-limitative examples of metals which may be suitable for the anode 16 include at least one of nickel, platinum, and mixtures thereof. Some non-limitative examples of ceramics which may be suitable for the anode 16 include at least one of $Ce_xSm_yO_{2-\delta}$, $Ce_xGd_yO_{2-\delta}$, $La_xSr_yCr_zO_{3-\delta}$, and mixtures thereof. Some non-limitative examples of cermets which may be suitable for the anode 16 include at least one of Ni—YSZ, Cu—YSZ, Ni—SDC, Ni—GDC, Cu—SDC, Cu—GDC, and mixtures thereof.

In an embodiment of the present invention, some non-limitative examples of metals which may be suitable for the cathode 18 include at least one of silver, platinum and mixtures thereof. Some non-limitative examples of ceramics which may be suitable for the cathode 18 include at least one of $Sm_xSr_yCoO_{3-\delta}$, $Ba_xLa_yCoO_{3-\delta}$, $Gd_xSr_yCoO_{3-\delta}$, and mixtures thereof.

Figure 2:
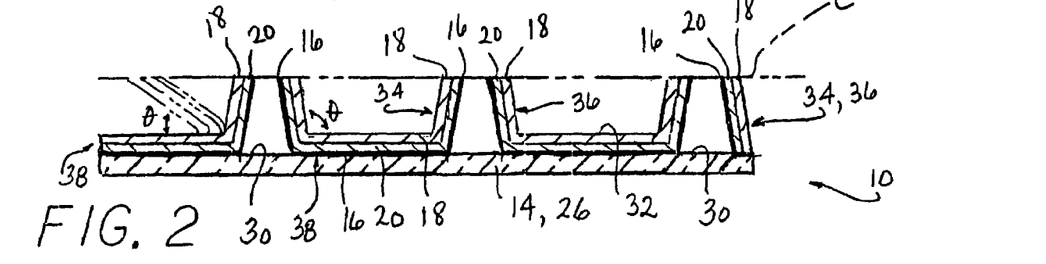
FIG. 2 is a cutaway, cross-sectional side view of the embodiment shown in FIG. 1 after CMP and removal of pattern material.

Referring now to FIG. 2, areas of higher topography 22 are then removed from areas of lower topography 24 using chemical/mechanical planarization to form a predetermined fuel cell structure 10. An illustrative cut line C demonstrates where the CMP may take place. It is to be understood that cut line C may be higher or lower as desired and/or as necessitated by a particular end use, as long as all active fuel cell element(s) desired to be exposed are so exposed.

It is to be understood that pattern 12 may remain as part of the fuel cell structure 10, or it may be removed. It is to be further understood that pattern 12 may be formed from any suitable material. It is desirable that the pattern material be an easily patterned material, or a relatively easily patterned material. An easily patterned material is a sacrificial material. It is to be understood that wherever "patterning" is discussed herein, the patterning step may be accomplished by any suitable patterning process, including but not limited to shadow masking, photo-imaging, screen printing, wet etching, plasma etching, and the like, and/or combinations thereof.

Some examples of sacrificial materials include, but are not limited to photo-imagable films, metals, e.g. aluminum, metal oxides, and/or mixtures thereof, and/or any other easily patterned material which may or may not be part of the fuel cell structure 10. Photo-imagable films include, but are not limited to spin-on photo-resist materials, dry film photo-resist materials, and the like.

If the pattern 12 is removed, it is to be understood that the removing step may be accomplished by any suitable process (es). In an embodiment, plasma etching, wet etching, oxygen ashing, solvent stripping, and the like, and/or combinations thereof accomplish the removing step. FIG. 2 shows the pattern 12 removed to form one or more first gas flow passages 30. It is to be understood that either anode 16 or cathode 18 may be exposed to the first gas flow passage 30. The embodiment of FIG. 2 shows anodes 16 being exposed to first gas flow passage 30. A second gas flow passage 32 may be formed by the architecture of the fuel cell structure 10 and/or through removal of pattern 12. It is to be understood that either anode 16 or cathode 18 may be exposed to the second gas flow passage 32. The embodiment of FIG. 2 shows cathodes 18 being exposed to second gas flow passage 32.

It is to be understood that the embodiments of the fuel cells 10 of the present invention may be single chamber fuel cells or dual chamber fuel cells. If the fuel cells 10 are single chamber, a mixture of reactants and oxidants is carried to both anode 16 and cathode 18. If the fuel cells 10 are dual chamber, reactants are carried to the anode 16, and oxidants are carried to the cathode 18. As such, if the fuel cell 10 of FIG. 2 were a dual chamber fuel cell, first gas flow passage 30 would carry reactants, and second gas flow passage 32 would carry oxidants.

In an embodiment, the reactants are fuels, and the oxidants are one of oxygen, air, and mixtures thereof. It is to be understood that any suitable fuel/reactant may be used with the fuel cell 10 of the present invention. In an embodiment, the fuel/reactant is selected from at least one of methane, ethane, propane, butane, pentane, methanol, ethanol, higher straight chain or mixed hydrocarbons, for example, natural gas or gasoline (low sulfur hydrocarbons may be desirable, e.g. low sulfur gasoline, low sulfur kerosene, low sulfur diesel), and mixtures thereof. In an alternate embodiment, the fuel/reactant is selected from the group consisting of butane, propane, methane, pentane, and mixtures thereof.

Suitable fuels may be chosen for their suitability for internal and/or direct reformation, suitable vapor pressure within the operating temperature range of interest, and/or like parameters.

It is to be understood that fuel cell 10, as well as each of its active elements, may be of any size, shape and/or configuration, as desired and/or necessitated by a particular end use. In an embodiment, each of the anode layer 16, the cathode layer 18 and the electrolyte layer 20 has a thickness ranging between about 0.5 µm and about 1000 µm. In an alternate embodiment, each layer 16, 18, 20 has a thickness ranging between about 50 µm and about 200 µm. In a further embodiment, the thickness of the anode layer 16, the cathode layer 18 and the electrolyte layer 20, combined, ranges between about 1.5 µm and about 3000 µm. In an alternate embodiment, this combined thickness of layers 16, 18, 20 ranges between about 150 µm and about 600 µm. The desired combined thickness of layers 16, 18, 20 generally depends upon mechanical properties of the system.

The fuel cell 10 as shown in FIG. 2 advantageously includes at least one free standing membrane structure 34 (as a non-limitative example, six free standing structures 34 are shown). The membrane structure 34 includes the electrolyte layer 20, the anode layer 16 disposed on one side of the electrolyte layer 20, and the cathode layer 18 disposed on either the same or the other side of the electrolyte layer 20.

In an embodiment, the free standing membrane structure 34 comprises one leg 36 of a substantially V-shaped member. The other leg 38 of the substantially V-shaped member is disposed on or partially in base surface 14.

An angle θ between the one leg 36 and the other leg 38 ranges between acute and obtuse. An acute angle θ is shown in phantom in FIG. 2, and an obtuse angle θ is shown in solid line. As such, it is to be understood that the sidewalls/pattern profiles of any of the embodiments of the present invention may be straight, sloped or retrograde in profile, depending on the method used for subsequent thin and/or thick film depositions and the desired shape of the final device. The pattern profiles in FIG. 2 are shown sloped, whereas the pattern profiles in FIGS. 6E and 7E are substantially straight.

Figure 3:
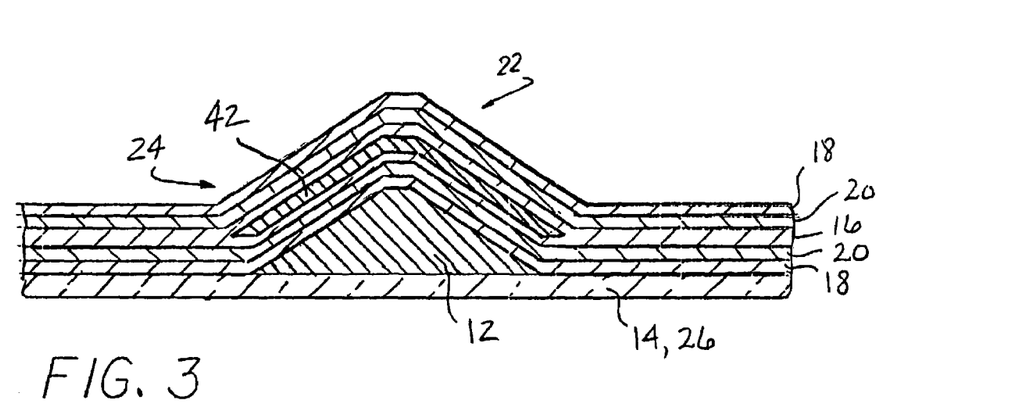
FIG. 3 is a cutaway, cross-sectional side view of an alternate embodiment of the present invention before CMP and optional removal of pattern material, showing vertical stacking of fuel cell assemblies.

Referring now to FIG. 3, a method of making a fuel cell stack includes the steps, as set forth above, of placing a first pattern 12 on a base surface 14 to create a predetermined topography on the base surface 14; and depositing either an anode layer 16, a cathode layer 18, and/or an electrolyte layer 20 over the first pattern 12.

The method of making a fuel cell stack further includes the step of placing a second pattern 42 on the at least one of an anode layer, a cathode layer and an electrolyte layer. A further anode layer 16, cathode layer 18, and/or electrolyte layer 20 is deposited over the second pattern 42.

Figure 4:
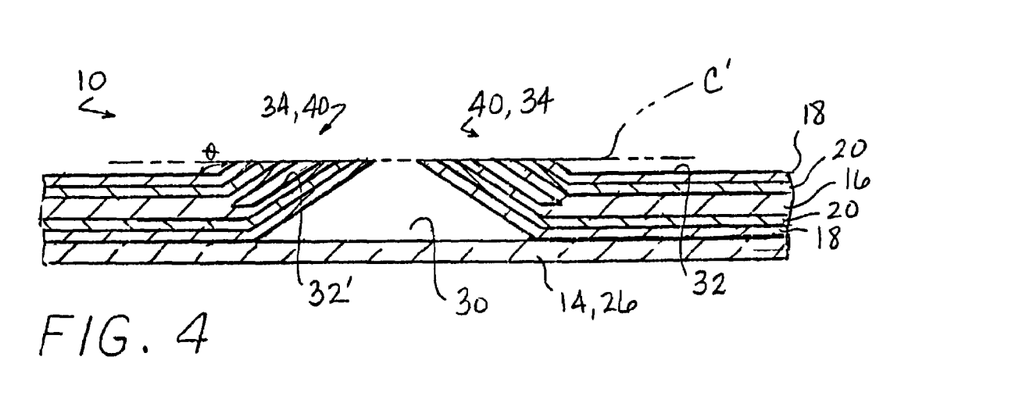
FIG. 4 is a cutaway, cross-sectional side view of the embodiment shown in FIG. 3 after CMP and removal of pattern material.

Referring now to FIG. 4, areas of higher topography 22 are then removed from areas of lower topography 24 using chemical/mechanical planarization to form a predetermined fuel cell stack structure 40. An illustrative cut line C' demonstrates where the CMP may take place. It is to be understood that cut line C' may be higher or lower as desired and/or as necessitated by a particular end use, as long as all active fuel cell element(s) desired to be exposed are so exposed.

Fuel cell stack structure 40 is a vertical stack structure. Although not shown, stacks 40 also may extend horizontally on substrate 26. (Horizontal stacking is shown in FIG. 2.)

It is to be understood that patterns 12, 42 may remain as part of the fuel cell structure 10, or one or both patterns 12, 42 may be removed. It is to be further understood that patterns 12, 42 may be formed from any suitable material(s).

It is desirable that the pattern material be an easily patterned material, or a relatively easily patterned material. In an embodiment, the first and second patterns 12, 42 are formed from a sacrificial material. Non-limitative examples of some suitable sacrificial materials are set forth above.

If the patterns 12 and/or 42 is/are removed, it is to be understood that the removing step may be accomplished by any suitable process(es), such as by one or more of the non-limitative processes set forth above. FIG. 4 shows the pattern 12 removed to form one or more first gas flow passages 30. It is to be understood that either anode 16 or cathode 18 may be exposed to the first gas flow passage 30. The embodiment of FIG. 4 shows cathodes 18 being exposed to first gas flow passage 30. A second gas flow passage 32 may be formed by the architecture of the fuel cell structure 10 and/or through removal of pattern 42 (passage 32'). It is to be understood that either anode 16 or cathode 18 may be exposed to the second gas flow passages 32, 32'. The embodiment of FIG. 4 shows anodes 16 being exposed to second gas flow passage 32', and cathodes 18 being exposed to second gas flow passage 32.

The embodiments of fuel cell 10 as shown in FIGS. 2 and 4 are single chamber solid oxide fuel cells. However, as stated herein, the fuel cells 10 may be adapted to become dual chamber fuel cells. As one non-limitative example of such an adaptation, patterns 12, 42 may be reconfigured, cut line C' may be moved from a horizontal cut line (as shown) to a vertical cut line, and patterns 12, 42 may be removed to form a fuel gas flow passage and an air gas flow passage.

Figure 5A:
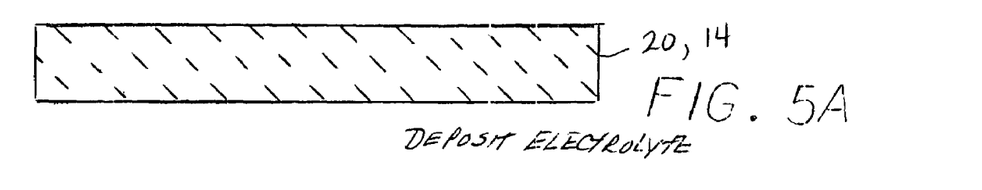
FIG. 5A is a cross-sectional side view of a first step of a non-limitative method of making an embodiment of the present invention, showing deposition of electrolyte.
Figure 5B:
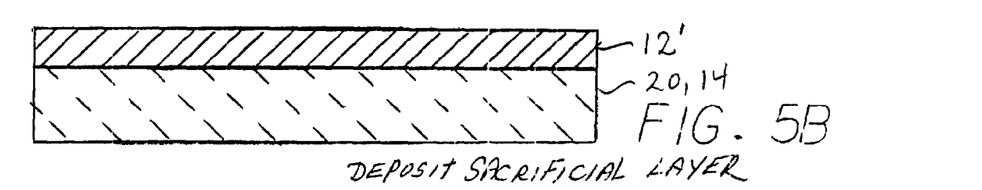
FIG. 5B is a cross-sectional side view of a second step of a non-limitative method of making an embodiment of the present invention, showing deposition of a sacrificial layer.
Figure 5C:
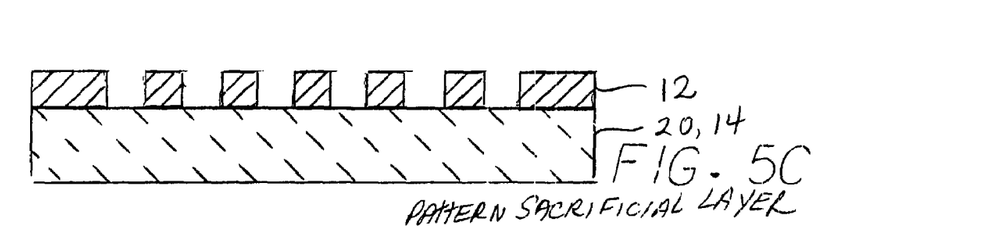
FIG. 5C is a cross-sectional side view of a third step of a non-limitative method of making an embodiment of the present invention, showing patterning of the sacrificial layer.
Figure 5D:
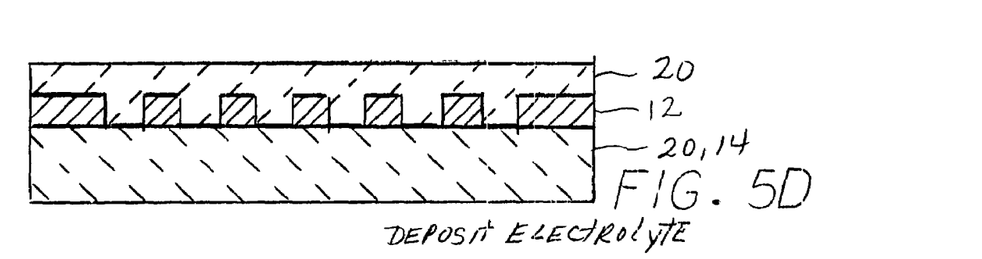
FIG. 5D is a cross-sectional side view of a fourth step of a non-limitative method of making an embodiment of the present invention, showing deposition of an electrolyte over the pattern.
Figure 5E:
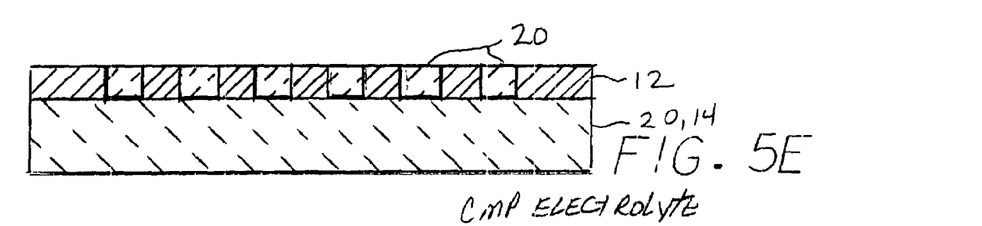
FIG. 5E is a cross-sectional side view of a fifth step of a non-limitative method of making an embodiment of the present invention after CMP.
Figure 5F:
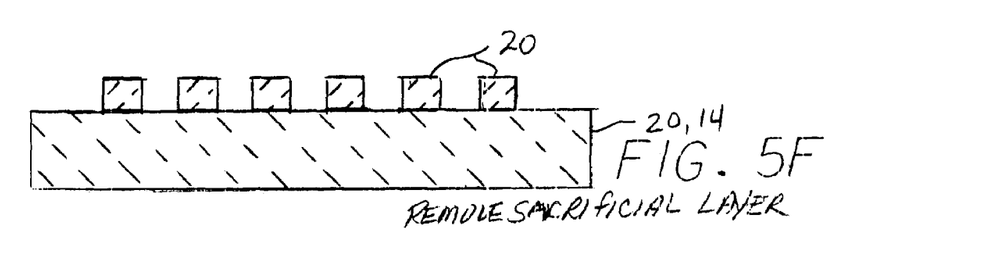
FIG. 5F is a cross-sectional side view of a sixth step of a non-limitative method of making an embodiment of the present invention, showing a patterned electrolyte layer.

Referring now to FIG. 5A, an electrolyte layer 20 is deposited and serves as a base surface 14. The pattern placing step of embodiments of the method of the present invention comprises the steps of depositing pattern material 12' on the base surface 14 (as shown in FIG. 5B); and patterning the pattern material 12' to form pattern 12 (as shown in FIG. 5C). In FIG. 5B et seq., the pattern 12 is formed from a sacrificial material. In FIG. 5D, a further electrolyte layer 20 is deposited over the pattern 12. Any undesired material from the further electrolyte layer 20 is removed through CMP. FIG. 5F shows the pattern 12 removed, leaving the further electrolyte layer 20 patterned in a reverse pattern of what was pattern 12. This is an example of use of an embodiment of the present method to form topography in materials that are difficult to pattern with, for example, standard photolithography techniques.

It is to be understood that the first deposition of pattern material 12' onto base surface 14 may be on base surface 14, or partially in base surface 14. FIG. 5B shows an example of deposition on base surface 14.

Figure 6A:
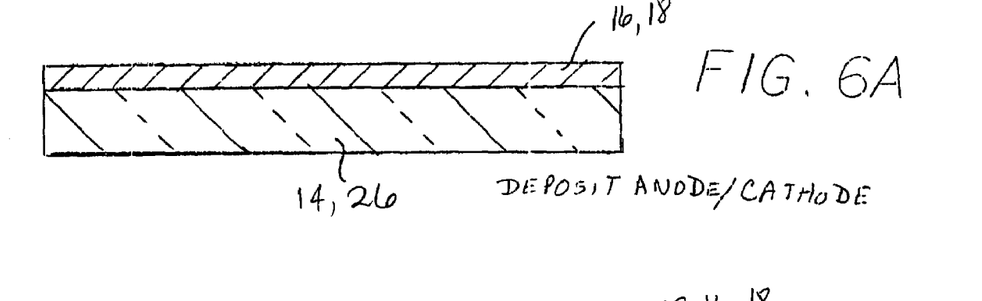
FIG. 6A is a cross-sectional side view of a first step of a non-limitative method of making an alternate embodiment of the present invention, showing deposition of an electrode layer.
Figure 6B:
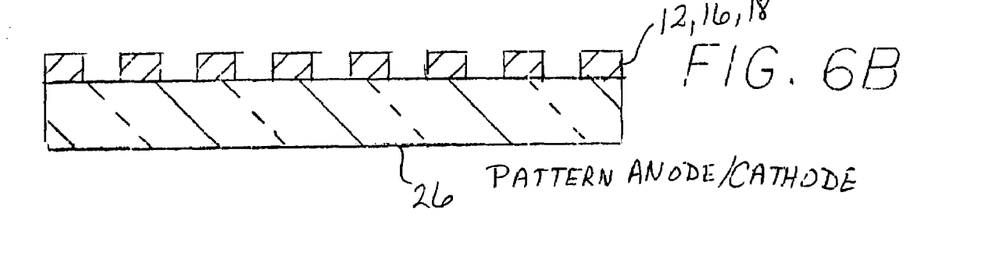
FIG. 6B is a cross-sectional side view of a second step of a non-limitative method of making an alternate embodiment of the present invention, showing patterning of the electrode layer.
Figure 6C:
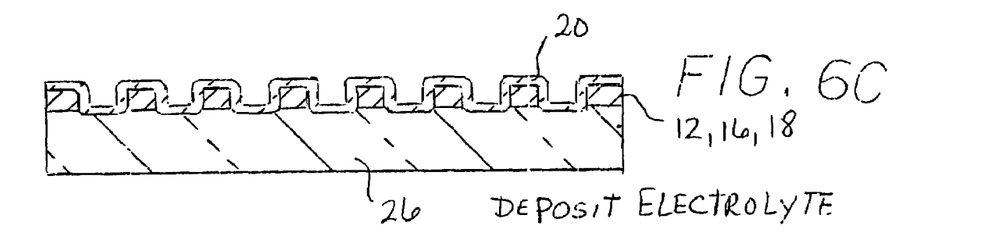
FIG. 6C is a cross-sectional side view of a third step of a non-limitative method of making an alternate embodiment of the present invention, showing deposition of an electrolyte layer over the pattern.
Figure 6D:
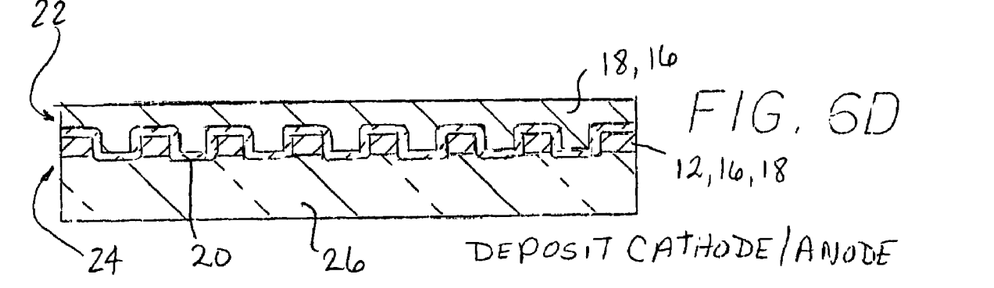
FIG. 6D is a cross-sectional side view of a fourth step of a non-limitative method of making an alternate embodiment of the present invention, showing deposition of a counter electrode layer over the electrolyte layer.
Figure 6E:
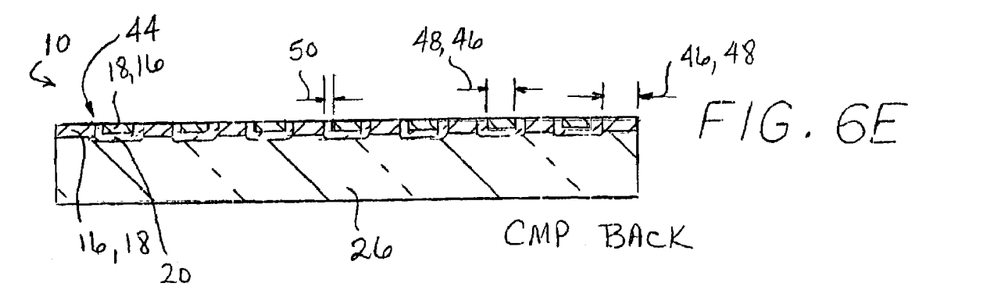
FIG. 6E is a cross-sectional side view of a fifth step of a non-limitative method of making an alternate embodiment of the present invention after CMP, showing a predetermined fuel cell structure.
Figure 7A:
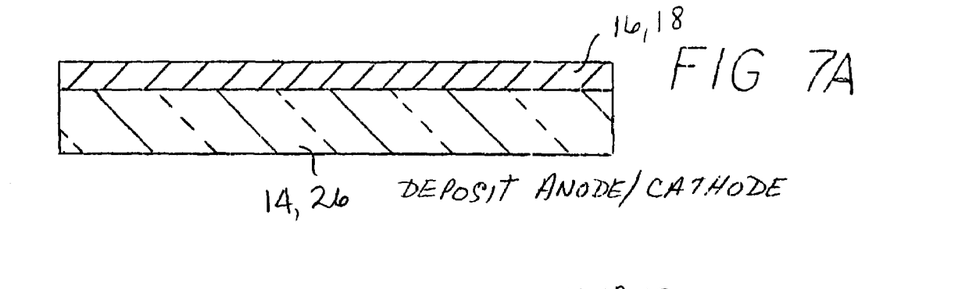
FIG. 7A is a cross-sectional side view of a first step of a non-limitative method of making a further alternate embodiment of the present invention, showing deposition of an electrode layer.

Referring now to FIG. 6A, a method of forming a fuel cell 10 includes the step of depositing an electrode layer 16, 18 on a base surface 14/substrate 26. FIG. 6B shows the electrode layer 16, 18 formed in a pattern 12 to create a predetermined topography on the substrate 26. FIG. 6C shows deposition of an electrolyte layer 20 over the patterned electrode layer 12, 16, 18. FIG. 6D shows deposition of a counter electrode layer 18, 16 over the electrolyte layer 20 (for example, if the electrode layer is anode 16, the counter electrode layer is cathode 18, and vice versa). FIG. 6E shows areas of higher topography 22 removed from areas of lower topography 24 using CMP to form a predetermined fuel cell structure 10.

Figure 7B:
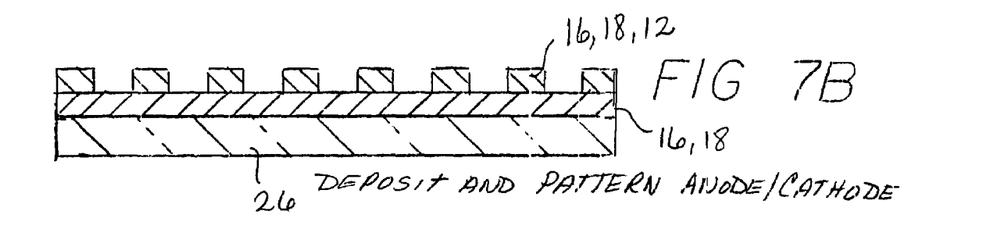
FIG. 7B is a cross-sectional side view of a second step of a non-limitative method of making a further alternate embodiment of the present invention, showing deposition and patterning of a second layer of the electrode.

If an electrode 16, 18 is patterned (as shown in FIGS. 6B and 7B), it is desirable that the electrode 16, 18 be formed from a material which is relatively easy to pattern. Some examples of such materials include, but are not limited to material(s) suitable for anodes and/or cathodes having as a main component thereof at least one of aluminum, tantalum, tungsten, iron, nickel, and mixtures thereof.

Referring yet to FIG. 6E, the fuel cell structure 10 comprises a plurality of fuel cell assemblies 44, each of the fuel cell assemblies comprising an anode 16 disposed on one side of an electrolyte 20, and a cathode 18 disposed on the same or the other side of the electrolyte 20 (anode 16/cathode 18/electrolyte 20 may be configured in any manner as long as electrolyte 20 separates anode 16 from cathode 18). Each of the anode 16, cathode 18, and electrolyte 20 has a width 46, 48, 50, respectively. The anode width 46 and the cathode width 48 may each range between about 1.5 μm and about 100 μm. The electrolyte width 50 may range between about 0.5 μm and about 100 μm.

The fuel cell 10 of FIG. 6E is an example of a single chamber solid oxide fuel cell.

It is to be understood that the Figures selected to depict various widths, lengths and other dimensions were selected for illustrative purposes, and the recited values for the various dimensions are meant to apply to any of the embodiments disclosed herein and to any or all of the Figures discussed herein.

Figure 7C:
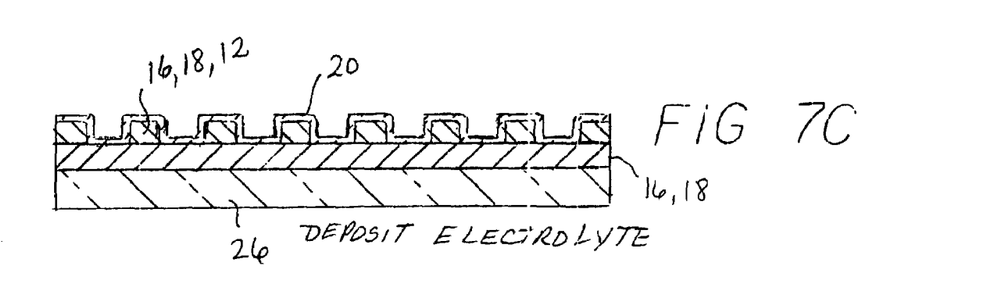
FIG. 7C is a cross-sectional side view of a third step of a non-limitative method of making a further alternate embodiment of the present invention, showing deposition of an electrolyte layer over the patterned electrode layer.
Figure 7D:
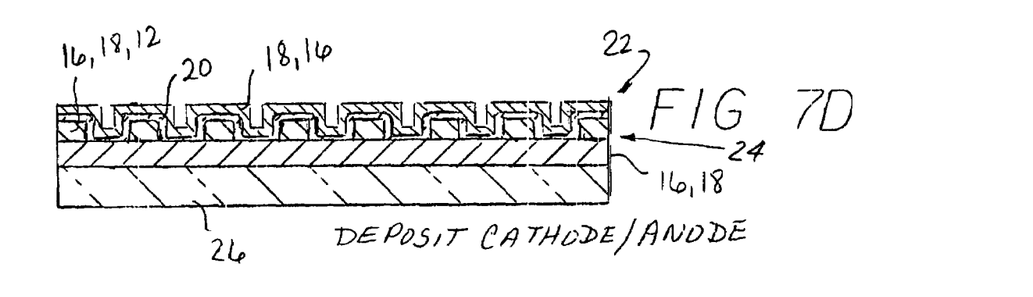
FIG. 7D is a cross-sectional side view of a fourth step of a non-limitative method of making a further alternate embodiment of the present invention, showing deposition of a counter electrode layer over the electrolyte layer.
Figure 7E:
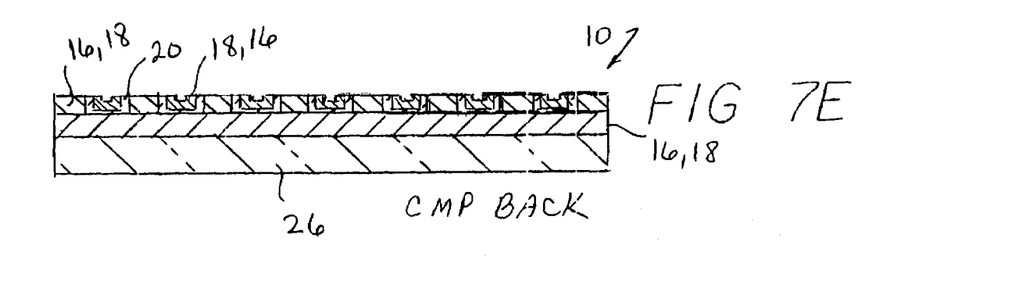
FIG. 7E is a cross-sectional side view of a fifth step of a non-limitative method of making a further alternate embodiment of the present invention after CMP, showing an alternate predetermined fuel cell structure.

Referring now to FIG. 7A, a method of forming a fuel cell 10 includes the step of depositing an electrode layer 16, 18 on a base surface 14/substrate 26. FIG. 7B shows deposition of a further electrode layer 16, 18 formed in a pattern 12 to create a predetermined topography on the substrate 26. FIG. 7C shows deposition of an electrolyte layer 20 over the patterned electrode layer 16, 18, 12. FIG. 7D shows deposition of a counter electrode layer 18, 16 over the electrolyte layer 20 (for example, if the electrode layer and further electrode layer are anodes 16, the counter electrode layer is cathode 18, and vice versa). FIG. 7E shows areas of higher topography 22 removed from areas of lower topography 24 using CMP to form a predetermined fuel cell structure 10.

The fuel cell 10 of FIG. 7E is an example of a single chamber solid oxide fuel cell.

Referring now to FIG. 8, a top view of the fuel cells 10 of FIG. 6E or 7E is presented. An electrode probe 52 and a counter electrode probe 54 are each operatively connected to fuel cell 10. It is to be understood that fuel cell 10 may be any suitable shape, size and/or configuration. In an embodiment, the fuel cell structure 10 width 56 may range between about 0.01 cm and about 12 cm, and the fuel cell structure length 58 may range between about 0.01 cm and about 12 cm. In an alternate embodiment, the fuel cell structure width 56 may range between about 5 mm and about 25 mm, and the fuel cell structure length 58 may range between about 5 mm and about 25 mm.

A method of using a fuel cell 10 may include the step of operatively connecting the fuel cell 10 to at least one of an electrical load L and an electrical storage device S. The electrical load L may include many devices, including but not limited to any or all of computers, portable electronic appliances (e.g. portable digital assistants (PDAs), portable power tools, etc.), and communication devices, portable or otherwise, both consumer and military. The electrical storage device S may include, as non-limitative examples, any or all of capacitors, batteries, and power conditioning devices. Some exemplary power conditioning devices include uninterruptible power supplies, DC/AC converters, DC voltage converters, voltage regulators, current limiters, etc.

It is also contemplated that the fuel cell 10 of the present invention may, in some instances, be suitable for use in the transportation industry, e.g. to power automobiles, and in the utilities industry, e.g. within power plants.

Figure 9:
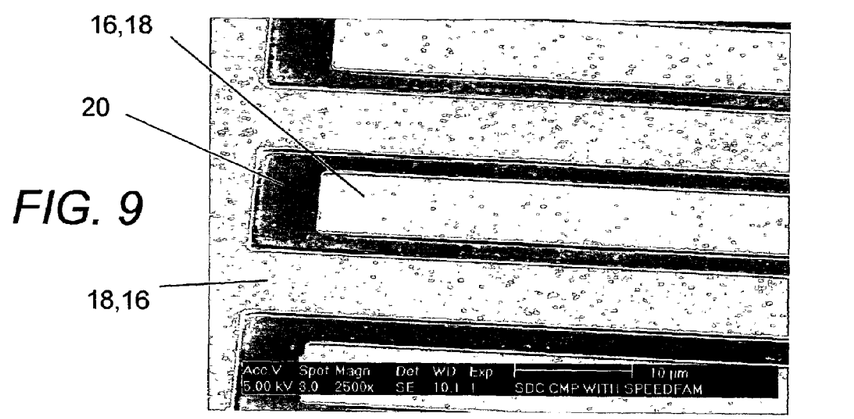
FIG. 9 is a SEM image at 2500× magnification of a top view of an embodiment of a fuel cell structure of the present invention.

FIG. 9 is a SEM image at 2500× magnification of a top view of an embodiment of a fuel cell structure 10 formed by a method(s) of the present invention. SDC is one of the materials used to form the fuel cell 10 shown in FIG. 9.

Figure 10:
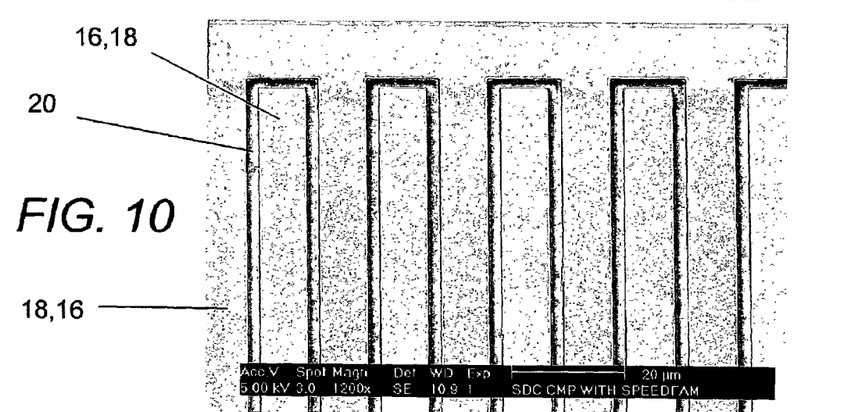
FIG. 10 is a SEM image at 1200× magnification of a top view of an alternate embodiment of a fuel cell structure of the present invention.

FIG. 10 is a SEM image at 1200× magnification of a top view of an alternate embodiment of a fuel cell structure 10 formed by a method(s) of the present invention. SDC is one of the materials used to form the fuel cell 10 shown in FIG. 10.

Figure 11:
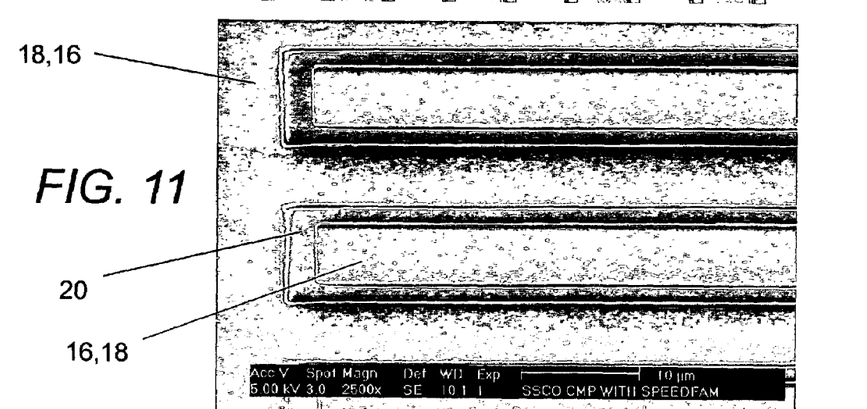
FIG. 11 is a SEM image at 2500× magnification of a top view of a further alternate embodiment of a fuel cell structure of the present invention.

FIG. 11 is a SEM image at 2500× magnification of a top view of a further alternate embodiment of a fuel cell structure 10 formed by a method(s) of the present invention. SSCO is one of the materials used to form the fuel cell 10 shown in FIG. 11.

It is to be understood that the deposition steps of any of the methods disclosed herein may be accomplished by any suitable processes. Some non-limitative examples of such processes include Chemical Vapor Deposition (CVD), Physical Vapor Deposition (PVD), spin coating, atomic deposition, and/or the like, and/or combinations thereof.

In any of the embodiments of the methods of the present invention, after any or all desired layers, or any combination of desired layers are deposited, the fuel cell 10 is sintered/annealed at temperatures ranging between about 200° C. and about 1500° C. In an alternate embodiment, the fuel cell 10 is sintered/annealed at temperatures ranging between about 600° C. and about 1100° C. It is to be understood that the temperature should be high enough to sinter the anode 16, cathode 18 and electrolyte 20, not lower than the operating temperature of the fuel cell 10, and not higher than any active fuel cell elements can withstand.

While several embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A method of making a fuel cell, comprising the steps of:
    placing a pattern on a base surface to create a predetermined topography on the base surface;
    depositing at least one of an anode layer, a cathode layer and an electrolyte layer over the pattern; and
    removing areas of higher topography from areas of lower topography using chemical mechanical planarization to form a predetermined fuel cell structure.

2. The method as defined in claim 1 wherein the pattern is formed from a sacrificial material.

3. The method as defined in claim 2 wherein the sacrificial material comprises photo-imagable films, metals, metal oxides, and mixtures thereof.

4. The method as defined in claim 2, further comprising the step of removing the pattern from the fuel cell structure.

5. The method as defined in claim 4 wherein the removing step is accomplished by at least one of plasma etching, wet etching, oxygen ashing, and solvent stripping.

6. The method as defined in claim 1 wherein the electrolyte layer is deposited over the pattern.

7. The method as defined in claim 1 wherein one of the anode layer and the cathode layer is deposited over the pattern.

8. The method as defined in claim 1 wherein the pattern placing step comprises the steps of:
    depositing pattern material on the base surface; and
    patterning the pattern material by at least one of shadow masking, photo-imaging, screen printing, wet etching, plasma etching, and combinations thereof.

9. The method as defined in claim 1 wherein the pattern is formed from a material suitable for one of anodes and cathodes.

10. The method as defined in claim 9 wherein the material suitable for one of anodes and cathodes has as a main component thereof at least one of aluminum, tantalum, tungsten, iron, nickel, and mixtures thereof.

11. The method as defined in claim 1 wherein the fuel cell is a solid oxide fuel cell.

12. The method as defined in claim 1 wherein the base surface is one of a substrate, an anode, a cathode, an electrolyte, and a current collector.

13. The method as defined in claim 1 wherein each of the anode layer, the cathode layer and the electrolyte layer has a thickness ranging between about 0.5 μm and about 1000 μm.

14. The method as defined in claim 13 wherein the thickness of the anode layer, the cathode layer and the electrolyte layer combined ranges between about 1.5 μm and about 3000 μm.

15. The method as defined in claim 1 wherein each of the anode layer, the cathode layer and the electrolyte layer has a thickness ranging between about 50 μm and about 200 μm.

16. The method as defined in claim 15 wherein the thickness of the anode layer, the cathode layer and the electrolyte layer combined ranges between about 150 μm and about 600 μm.

17. The method as defined in claim 1 wherein the fuel cell structure width ranges between about 0.01 cm and about 12 cm, and wherein the fuel cell structure length ranges between about 0.01 cm and about 12 cm.

18. The method as defined in claim 17 wherein the fuel cell structure width ranges between about 5 mm and about 25 mm, and wherein the fuel cell structure length ranges between about 5 mm and about 25 mm.

19. The method as defined in claim 1 wherein the fuel cell structure comprises a plurality of fuel cell assemblies, each of the fuel cell assemblies comprising an anode disposed on one side of an electrolyte, and a cathode disposed on the one or an opposed side of the electrolyte, wherein each of the anode, electrolyte and cathode has a width, and wherein the width of each of the anode and the cathode ranges between about 1.5 μm and about 100 μm.

20. The method as defined in claim 19 wherein the width of the electrolyte ranges between about 0.5 μm and about 100 μm.

21. A method of making a fuel cell stack, further comprising the steps of:
    placing a first pattern on a base surface to create a predetermined topography on the base surface;
    depositing at least one of an anode layer, a cathode layer and an electrolyte layer over the first pattern;
    placing a second pattern on the at least one of an anode layer, a cathode layer and an electrolyte layer;
    depositing at least one of an anode layer, a cathode layer and an electrolyte layer over the second pattern; and
    removing areas of higher topography from areas of lower topography using chemical mechanical planarization to form a predetermined fuel cell stack structure.

22. The method as defined in claim 21 wherein the first and second patterns are formed from a sacrificial material.

23. The method as defined in claim 22 wherein the sacrificial material comprises photo-imagable films, metals, metal oxides, and mixtures thereof.

24. The method as defined in claim 22, further comprising the step of removing the first and second patterns from the fuel cell structure.

25. The method as defined in claim 21 wherein the electrolyte layer is deposited over the pattern.

26. The method as defined in claim 21 wherein one of the anode layer and the cathode layer is deposited over the pattern.

27. The method as defined in claim 21 wherein each of the pattern placing steps comprises the steps of:
depositing pattern material on one of the base surface and the at least one of the anode layer, the cathode layer and the electrolyte layer; and
patterning the pattern material by at least one of shadow masking, photo-imaging, screen printing, wet etching, plasma etching, and combinations thereof.

28. The method as defined in claim 21 wherein the first and second patterns are formed from a material suitable for one of anodes and cathodes.

29. The method as defined in claim 28 wherein the material suitable for one of anodes and cathodes has as a main component thereof at least one of aluminum, tantalum, tungsten, iron, nickel, and mixtures thereof.

30. The method as defined in claim 21 wherein the base surface is one of a substrate, an anode, a cathode, an electrolyte, and a current collector.

31. A fuel cell, comprising:
at least one free standing membrane structure having an end region not in contact with any adjacent structure, the end region of the free standing membrane structure comprising one leg of a substantially V shaped member, and the membrane structure comprising:
an electrolyte layer;
an anode aver disposed on one side of the electrolyte layer; and
a cathode layer disposed on the one side or an opposed side of the electrolyte layer; and
a base surface upon which an other leg of the substantially V shaped member is disposed.

32. The fuel cell as defined in claim 31 wherein an angle between the one leg and the other leg ranges between acute and obtuse.

33. The fuel cell as defined in claim 31 wherein the fuel cell is a single chamber fuel cell.

34. A fuel cell, comprising:
at least one free standing membrane structure having an end region not in contact with any adjacent structure, the membrane structure comprising:
an electrolyte layer;
an anode layer disposed on one side of the electrolyte layer; and
a cathode layer disposed on the one side or an opposed side of the electrolyte layer;
wherein the fuel cell is a dual chamber fuel cell, wherein reactants are adapted to flow into a first gas flow passage exposed to the anode layer, and wherein oxidants are adapted to flow into a second gas flow passage exposed to the cathode layer.

35. The fuel cell as defined in claim 31 wherein the base surface is one of a substrate, an anode, a cathode, an electrolyte, and a current collector.

36. The fuel cell as defined in claim 34 wherein at least one of the first and second gas flow passages is formed by removal of a sacrificial pattern material therefrom.

37. An electronic device, comprising:
a load; and
the fuel cell of claim 31 connected to the load.

38. The fuel cell as defined in claim 34, further comprising means for forming the first and second gas flow passages.

39. A fuel cell, comprising:
at least one free standing membrane structure having an end region not in contact with any adjacent structure, the membrane structure comprising:
an electrolyte layer;
an anode layer disposed on one side of the electrolyte layer; and
a cathode layer disposed on the one side or an opposed side of the electrolyte layer;
wherein each of the anode layer, electrolyte layer, and cathode layer has a width, and wherein the width of each of the anode and the cathode ranges between about 1.5 µm and about 100 µm.

40. The fuel cell as defined in claim 39 wherein the width of the electrolyte ranges between about 0.5 µm and about 100 µm.

41. A method of forming a single chamber solid oxide fuel cell, comprising the steps of:
depositing an electrode layer on a substrate;
patterning the electrode layer to create a predetermined topography on the substrate;
depositing an electrolyte layer over the patterned electrode layer;
depositing a counter electrode layer over the electrolyte layer; and
removing areas of higher topography from areas of lower topography using chemical mechanical planarization to form a predetermined solid oxide fuel cell structure.

* * * * *

UNITED STATES PATENT AND TRADEMARK OFFICE
CERTIFICATE OF CORRECTION

PATENT NO. : 7,067,215 B2  
APPLICATION NO. : 10/286235  
DATED : June 27, 2006  
INVENTOR(S) : Dennis Lazaroff et al.

It is certified that error appears in the above-identified patent and that said Letters Patent is hereby corrected as shown below:

In column 11, line 31, in Claim 31, delete "aver" and insert -- layer --, therefor.

Signed and Sealed this

First Day of December, 2009

David J. Kappos
*Director of the United States Patent and Trademark Office*